(12) United States Patent
Harrison

(10) Patent No.: US 6,376,564 B1
(45) Date of Patent: Apr. 23, 2002

(54) STORAGE-STABLE COMPOSITIONS USEFUL FOR THE PRODUCTION OF STRUCTURAL FOAMS

(75) Inventor: Bruce Lee Harrison, Sterling Heights, MI (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/260,421

(22) Filed: Mar. 1, 1999

Related U.S. Application Data

(60) Provisional application No. 60/098,110, filed on Aug. 27, 1998.

(51) Int. Cl.$^7$ .............................. C08J 9/32; C08J 9/236
(52) U.S. Cl. .......................... 521/54; 521/95; 521/135; 521/178
(58) Field of Search .................... 521/178, 135, 521/95, 54

(56) References Cited

U.S. PATENT DOCUMENTS

| | | |
|---|---|---|
| 2,959,508 A | 11/1960 | Graham et al. ............. 154/100 |
| 3,316,187 A | 4/1967 | Grosner, et al. ............. 260/2.5 |
| 3,615,972 A | 10/1971 | Morehouse et al. .......... 156/79 |
| 3,629,163 A | 12/1971 | Nolken ....................... 260/2.5 |
| 3,756,984 A | 9/1973 | Klaren et al. ........... 260/47 EC |
| 4,066,625 A | 1/1978 | Bolger ...................... 260/59 R |
| 4,268,656 A | 5/1981 | Ray-Chaudhuri et al. ... 528/103 |
| 4,360,649 A | 11/1982 | Kamio et al. ................ 525/484 |
| 4,542,202 A | 9/1985 | Takeuchi et al. .............. 528/96 |
| 4,546,155 A | 10/1985 | Hirose et al. ................ 525/504 |
| 4,610,836 A | 9/1986 | Wycech ....................... 264/313 |
| 4,695,343 A | 9/1987 | Wycech ....................... 156/196 |
| 4,732,806 A | 3/1988 | Wycech ....................... 428/241 |
| 4,751,249 A | 6/1988 | Wycech ........................ 521/54 |
| 4,798,848 A | 1/1989 | Diethelm ...................... 521/89 |
| 4,861,097 A | 8/1989 | Wycech ....................... 296/188 |
| 4,901,500 A | 2/1990 | Wycech ........................ 52/793 |
| 4,908,930 A | 3/1990 | Wycech ...................... 29/527.2 |
| 4,922,596 A | 5/1990 | Wycech ...................... 29/897.2 |
| 4,923,902 A | 5/1990 | Wycech ........................ 521/54 |
| 4,978,562 A | 12/1990 | Wycech ...................... 428/35.8 |
| 4,995,545 A | 2/1991 | Wycech ....................... 228/119 |
| 5,019,605 A | 5/1991 | Jannic ......................... 523/219 |
| 5,077,376 A | 12/1991 | Dooley ........................ 528/113 |
| 5,124,186 A | 6/1992 | Wycech ...................... 428/35.8 |
| 5,134,239 A | 7/1992 | Bertram et al. .............. 546/112 |
| 5,274,006 A | 12/1993 | Kagoshima et al. .......... 521/85 |
| 5,407,978 A | 4/1995 | Bymark et al. .............. 523/457 |
| 5,430,112 A | 7/1995 | Sakata et al. ................ 525/526 |
| 5,439,977 A | 8/1995 | Yokota et al. ............... 525/113 |
| 5,453,453 A | 9/1995 | Lamon et al. ................. 521/54 |
| 5,462,975 A | * 10/1995 | Yamamoto et al. .......... 521/135 |
| 5,464,910 A | 11/1995 | Nakatsuka et al. .......... 525/486 |
| 5,543,486 A | 8/1996 | Abe et al. ...................... 528/92 |
| 5,548,058 A | 8/1996 | Muroi et al. ................... 528/93 |
| 5,575,526 A | 11/1996 | Wycech ....................... 296/205 |
| 5,717,011 A | 2/1998 | Griggs et al. ................ 523/414 |
| 5,733,954 A | 3/1998 | McKenzie et al. ........... 523/414 |
| 5,755,486 A | 5/1998 | Wycech ....................... 296/188 |
| 5,789,498 A | 8/1998 | Ohnishi et al. .............. 525/526 |
| 5,798,399 A | 8/1998 | Griggs et al. ................ 523/414 |
| 5,801,218 A | 9/1998 | McKenzie et al. ........... 523/414 |
| 5,888,600 A | 3/1999 | Wycech ....................... 428/35.9 |
| 5,989,692 A | * 11/1999 | Brown ......................... 521/178 |
| 5,996,167 A | 12/1999 | Close ....................... 15/230.12 |
| 6,040,350 A | 3/2000 | Fukui .......................... 521/135 |
| 6,103,784 A | * 8/2000 | Hilborn et al. .............. 521/178 |
| 6,121,348 A | * 9/2000 | White ......................... 521/135 |
| 6,218,442 B1 | * 4/2001 | Hilborn et al. .............. 521/178 |

FOREIGN PATENT DOCUMENTS

| | | |
|---|---|---|
| EP | 891 918 | 1/1999 |
| WO | WO93/05103 | 3/1993 |
| WO | WO 99/08854 | 2/1999 |

OTHER PUBLICATIONS

Encyclopedia of Polymer Science and Engineering, vol. 6, pp. 322–382.

\* cited by examiner

Primary Examiner—Morton Foelak
(74) Attorney, Agent, or Firm—Stephen D. Harper

(57) ABSTRACT

Foamable compositions based on epoxy resins which exhibit good shelf life are obtained through the use of specific blowing agent and curing accelerator systems. The blowing agent system contains azodicarbonamide, while the curative system contains an amine-epoxy adduct such as an imidazole-epoxy adduct. The compositions are capable of providing structural foams which are useful in the manufacture of reinforced structural members and the like.

25 Claims, No Drawings

STORAGE-STABLE COMPOSITIONS USEFUL FOR THE PRODUCTION OF STRUCTURAL FOAMS

The application claims priority from provisional application Serial No. 60/098,110, filed Aug. 27, 1998.

BACKGROUND OF THE INVENTION

1. Field of the Invention

The invention pertains to storage-stable foamable compositions based on epoxy resins. More specifically, specific combinations of blowing agents and curing accelerators are utilized to obtain resins which exhibit improved stability at room temperature over prolonged periods of time, yet can be heated and cured to provide foams capable of strengthening and stiffening hollow metal parts and the like.

2. Discussion of the Related Art

It is known that a number of industries, e.g., the automobile industry, require parts that are both strong and lightweight. One attempt to achieve this balance between strength and minimal weight provides for hollow metal parts. However, hollow metal parts are easily distorted. Accordingly, it is also known that the presence of structural foam in the cavities of the hollow parts can improve the strength and stiffness of such parts.

Generally, such foams comprise a thermosettable resin such as an epoxy resin, a blowing agent and a filler. Preferably, these foams have a density of about 20–40 lb/ft$^3$ (about 0.30–0.65 g/cc) and are able to withstand heat in excess of 175° C., more preferably in excess of 200° C. Optional ingredients include accelerators, curing, agents, processing aids, stabilizers, colorants, and UV absorbers.

Specific formulas for structural foam can vary widely. For example, U.S. Pat. No. 5,575,526 teaches several resin-based structural foams including Formula 2, which contains 54.5% EPON 828 epoxy resin, 7.5% HALOXY 62 epoxy diluent, 6.1% DER 732 flexible epoxy, 2.0% EXPANCEL 551DU blowing agent, 8.8% MICROS microspheres, 17.7% 3M K20 microspheres and 3.4% DI-CY dicyandiamide curing agent. U.S. Pat. No. 5,755,486 discloses thermally expandable resin-based materials containing, for example, epoxy resin, acrylonitrile-butadiene rubber, calcium carbonate, carbon black, fumed silica, glass spheres, curing agent, accelerator, and blowing agent. Modified ureas and blocked boron trichloride complexes are taught to be suitable for use as accelerators. Structural foams such as, e.g., TEROCORE® (a product of Henkel Surface Technologies), are now used in a variety of industries.

One recurrent problem with many of the structural foam formulations of this type that have been developed to date, particularly the one part formulations, has been their relatively short shelf-life.

Ideally, the components of such formulations once combined together should remain stable and unreacted under the conditions normally encountered during storage and shipment. It would be highly desirable for the properties of the formulations to be unchanged when stored at temperatures at or somewhat above room temperature over a several week or several month period. Unfortunately, certain of the presently available structural foam products tend to partially expand and cure at a temperature of 130° F. (a temperature which storage facilities and transportation means frequently exceed during the summer months or in warm climates) within 24 hours. Merely lowering the amount of curative is not the solution to the problem, since this will typically adversely affect the ability to cure and foam the resin when desired within commercially acceptable temperature and time limits.

SUMMARY OF THE INVENTION

It has now been surprisingly discovered that the shelf-life problems inherent in previously known structural foam formulations based on epoxy resins may be effectively alleviated through the use of amine-epoxy adduct curatives and an azodicarbonamide blowing agent. Storage-stable foamable compositions thus are provided which are comprised of one or more epoxy resins, one or more blowing agents (at least one of which must be an azodicarbonamide), and one or more curatives (at least one of which must be an amine-epoxy adduct). In one especially advantageous aspect of the invention, the foamable composition is in the form of a pliable dough which additionally contains one or more fillers, particularly hollow glass microspheres. Such compositions when foamed and cured furnish reduced density foams having excellent physical properties, including high strength and stiffness.

DETAILED DESCRIPTION OF THE INVENTION

Any of the thermosettable resins having an average of more than one (preferably, two or more) epoxy groups per molecule known or referred to in the art may be utilized as the epoxy resin component of the present invention.

Epoxy resins are described, for example, in the chapter entitled "Epoxy Resins" in the Second Edition of the *Encyclopedia of Polymer Science and Engineering*, Volume 6, pp. 322–382 (1986). Exemplary epoxy resins include polyglycidyl ethers obtained by reacting polyhydric phenols such as bisphenol A, bisphenol F, bisphenol AD, catechol, resorcinol, or polyhydric alcohols such as glycerin and polyethylene glycol with haloepoxides such as epichlorohydrin; glycidylether esters obtained by reacting hydroxycarboxylic acids such as p-hydroxybenzoic acid or beta-hydroxy naphthoic acid with epichlorohydrin or the like; polyglycidyl esters obtained by reacting polycarboxylic acids such as phthalic acid, tetrahydrophthalic acid or terephthalic acid with epichlorohydrin or the like; epoxidated phenolic-novolac resins (sometimes also referred to as polyglycidyl ethers of phenolic novolac compounds); epoxidated polyolefins; glycidylated aminoalcohol compounds and aminophenol compounds, hydantoin diepoxides and urethane-modified epoxy resins. Mixtures of epoxy resins may be used if so desired; for example, mixtures of liquid (at room temperature), semi-solid, and/or solid epoxy resins can be employed. Any of the epoxy resins available from commercial sources are suitable for use in the present invention. Preferably, the epoxy resin has an epoxide equivalent molecular weight of from about 150 to 1000. The use of epoxy resins based on glycidyl ethers of bisphenol A is especially advantageous. The epoxy resin(s) preferably have an average of about 2 epoxy groups per molecule. The epoxy resin or resins should be selected so as to provide the desired combination of properties in both the foamable dough and the final cured foam.

Selection of the blowing agent system to be employed is critical to the attainment of a storage-stable foamable composition. Azodicarbonamide (also sometimes referred to as 1,1'-azobisformamide, AZDC, or ADC) must comprise at least part of the blowing agent system. Preferably, the blowing agent system is predominantly (i.e. >50% by weight) azodicarbonamide. Even more preferably, at least 80% by weight of the total amount of the blowing agent system is azodicarbonamide. Blowing agents such as sulfonyl hydrazides may be used as minor components of the blowing agent system. In one embodiment, however, azodicarbonamide is essentially the only blowing agent present in the foamable composition. Azodicarbonamide is available from a number of commercial sources; for example, it is sold under the trademark UNICELL by Dong Jin Chemical of South Korea and under the CELOGEN trademark by Uniroyal Chemical. The particle size of the azodicarbonamide may be adjusted so as to provide the desired foaming characteristics in the foamable composition. For example, it has been found that relatively small particle size azodicarbonamides tend to produce foams having more uniform cell structure than coarser grade azodicarbonamides. "Activated" or "modified" forms of azodicarbonamide may be used to advantage in the present invention.

In some formulations, it may be desirable to also utilize a blowing agent activator or accelerator so as to lower the temperature at which release of the gas from the blowing agent takes or to increase the rate at which gas is released at a given cure temperature. Typically, from about 0.1% to about 2% blowing agent accelerator/activator based on the weight of the foamable composition is employed, although the optimum amount will of course vary depending upon the activator/accelerator selected, the amount of blowing agent, cure temperature and other variables. Excess activator/accelerator should not be present in the foamable composition, however, since the storage stability may be undesirably compromised. Suitable blowing agent activators/accelerators include, but are not limited to, ureas (such as the surface-coated oil-treated urea sold by Uniroyal Chemical under the trademark BIK OT), polyols, organic acids, amines, and lead, zinc, tin, calcium and cadmium oxides and salts (including carboxylic acid salts).

Also critical in the operation of the present invention is the type of curative system used. Although more than one type of curative may be present, at least one curative must be an amine-epoxy adduct. Amine-epoxy adducts are well-known in the art and are described, for example, in U.S. Pat. Nos. 3,756,984, 4,066,625, 4,268,656, 4,360,649, 4,542,202, 4,546,155, 5,134,239, 5,407,978, 5,543,486, 5,548,058, 5,430,112, 5,464,910, 5,439,977, 5,717,011, 5,733,954, 5,789,498, 5,798,399 and 5,801,218, each of which is incorporated herein by reference in its entirety. Such amine-epoxy adducts are the products of the reaction between one or more amine compounds and one or more epoxy compounds. Carboxylic acid anhydrides, carboxylic acids, phenolic novolac resins, water, metal salts and the like may also be utilized as additional reactants in the preparation of the amine-epoxy adduct or to further modify the adduct once the amine and epoxy have been reacted. Preferably, the adduct is a solid which is insoluble in the epoxy resin component of the present invention at room temperature, but which becomes soluble and functions as an accelerator to increase the cure rate upon heating. While any type of amine could be used (with heterocyclic amines and/or amines containing at least one secondary nitrogen atom being preferred), imidazole compounds are particularly preferred. Illustrative imidazoles include 2-methyl imidazole, 2,4-dimethyl imidazole, 2-ethyl-4-methyl imidazole, 2-phenyl imidazole and the like. Other suitable amines include, but are not limited to, piperazines, piperidines, pyrazoles, purines, and triazoles. Any kind of epoxy compound can be employed as the other starting material for the adduct, including monofunctional, bifunctional, and polyfunctional epoxy compounds such as those described previously with regard to the epoxy resin component. Suitable amine-epoxy adducts are available from commercial sources such as Ajinomoto, Inc., Shell, Pacific Anchor Chemical Company, and the Asahi Chemical Industry Company Limited. The products sold by Ajinomoto under the trademarks AJICURE PN-23 and AJICURE PN-40 and by Air Products under the trademark ANCAMINE 2441 are especially preferred for use in the present invention.

The curing of the epoxy resin(s) utilized in the present invention may be additionally assisted by the incorporation of other substances capable of promoting the desired hardening upon heating. Such materials are referred to herein as "curatives", but also include the materials referred to by workers in the field as curing agents, hardeners, accelerators, activators, and catalysts. While certain curatives promote epoxy resin curing by catalytic action, others participate directly in the reaction of the resin and become incorporated into the thermoset polymeric network which is formed. Although any of the curatives (curing agents) known in the epoxy resin field (see the chapter in the *Encyclopedia of Polymer Science and Engineering* referenced hereinabove) may be used in the present invention in addition to the amine-epoxy adduct, the use of one or more nitrogen-containing compounds such as imidazoles, substituted ureas, amino compounds, amine salts, and quaternary ammonium compounds as the auxiliary curative(s) is desirable (provided that such compounds which cause an unacceptably high degree of epoxy resin reaction under normal storage conditions are avoided). Dicyandiamide (sold commercially by Air Products under the trademark "DICY") is a particularly preferred auxiliary curative, although other guanidine compounds may also be utilized. In one desirable embodiment of the invention, dicyandiamide (preferably, about 0.5–8 wt. % based on the total weight of the foamable composition) is used in combination with an amine-epoxy adduct (preferably, about 0.1–5 wt. %) in the curative system. The curative system must, however, be selected such that it does not catalyze curing of the foamable composition to any significant extent under typical storage conditions over an extended period. Preferably, the amounts and identities of the components of the curative system are selected such that the foamable composition retains a workable consistency (in one embodiment of the invention, a consistency resembling that of a pliable dough or puffy) for at least two weeks in storage at 130° F. (54° C.) without a significant loss in cured foam properties and does not expand in volume or decrease in specific gravity to an unacceptable extent under such conditions, but foams and cures within about 10 minutes upon being heated at about 150° C.

It will be especially desirable to include one or more glass fillers in the foamable composition, as such fillers have been found to impart useful characteristics to the resulting foam (especially where it is to be used to reinforce a structural member). For example, hollow glass microspheres may be added to reduce the density of the foam, and thus the overall weight of the reinforced structural member, while maintaining good stiffness and strength. Commercially available hollow glass microspheres (sometimes also referred to as glass microballoons or microbubbles) include the materials sold by Minnesota Mining and Manufacturing under the trademark SCOTCHLITE, with suitable grades including those sold under the designations B38, C15, K20 and VS 5500. The glass microspheres preferably have diameters in the range of from about 5 to about 200 micrometers (more preferably, less than about 70 micrometers). The crush strength of the hollow glass microspheres may be selected in accordance with the desired characteristics of the cured thermoset foam or reinforced structural member containing said foam. Microsperes having a crush strength in excess of 500 psi are typically employed, however. In a particularly desirable embodiment, hollow glass microspheres comprise from about 5 to about 50 percent by weight of the thermosettable composition. Glass fiber is another preferred type of glass filler, since it helps increase the strength and stiffness of the resulting foam. The glass fiber may be chopped, milled or in other physical forms.

Other types of fillers may also be optionally present in the foamable composition. Any of the conventional inorganic or organic fillers known in the thermosettable resin art may be used including, for example, silica (including fumed or pyrogenic silica, which may also function as a thixotropic or rheological control agent), calcium carbonate (including coated and/or precipitated calcium carbonate, which may also act as as thixotropic or rheological control agent, especially when it is in the form of fine particles), fibers other than glass fibers (e.g., wollastonite fibers, carbon fibers, ceramic fibers, aramid fibers), alumina, clays, sand, metals (e.g., aluminum powder), microspheres other than glass microspheres (including thermoplastic resin, ceramic and carbon microspheres, which may be solid or hollow, expanded or expandable), and any of the other organic or inorganic fillers known in the epoxy resin field. Other optional components include diluents (reactive or nonreactive) such as glycidyl ethers, glycidyl esters, acrylics, solvents, and plasticizers, toughening agents and flexibilizers (e.g., aliphatic diepoxides, polyaminoamides, liquid polysulfide polymers, rubbers including liquid nitrile rubbers such as butadiene-acrylonitrile copolymers, which may be functionalized with carboxy groups, amine groups or the like), adhesion promoters (also known as wetting or coupling agents; e.g., silanes, titanates, zirconates), colorants (e.g., dyes and pigments such as carbon black), stabilizers (e.g., antioxidants, UV stabilizers), and the like.

The formulations of the present invention preferably contain the above-discussed components in the following amounts (expressed as a percentage of the total weight of the foamable composition).

| Component | Preferred | More Preferred |
|---|---|---|
| Epoxy Resin(s) | about 35–85 | about 40–70 |
| Blowing Agent(s) | about 0.1–5 | about 0.5–3 |
| Amine-Epoxy Adduct Curative(s) | about 0.1–5 | about 0.25–3 |
| Other Curative(s) | up to about 10 | about 1–8 |
| Filler(s) | about 5–60 | about 20–45 |
| Adhesion Promoter(s) | up to about 2 | about 0.001–0.5 |
| Colorant(s) | up to about 2 | about 0.01–1 |
| Toughening/Flexibilizing Agent(s) | up to about 15 | about 0.5–10 |
| Blowing Agent Accelerator(s) | up to about 3 | about 0.05–2 |
| Stabilizer(s) | up to about 2 | about 0.01–1 |

Preferably, epoxy resin is present in an amount which is greater than the amount of any of the other components in the foamable composition.

The above-described ingredients may simply be combined and mixed to form the foamable composition using any of the conventional processing methods known in the epoxy resin art.

The preferred finished product preferably has the consistency of dough for easier handling. The dough may be shaped by extrusion or by hand or other means into any desired configuration. For example, the dough may be conformed to follow the contours of an irregular surface. The dough can then be cured and foamed by heating, preferably at a temperature of at least about 250° F. (about 120° C.), more preferably, at least about 300° F. (about 150° C.). Preferably, it is placed on or near the surface of a solid article comprised of, for example, metal or a thermoset or thermoplastic polymer such that a composite of the structural foam adhered to said surface is created upon foaming and curing. Alternatively, of course, the dough can be placed in a suitable container or vessel for storage until the use of the foamable composition is desired.

The foamable compositions of the present invention may be utilized in any end-use application where a relatively light-weight, yet strong, thermoset foam is needed. However, the foamable compositions are especially useful in the production of automobiles and other vehicles to maintain or increase the strength of structural members such as rockers, pillars, radiator support beams, doors, reinforcing beams, and the like. The use of structural foams in such applications is described, for example, in U.S. Pat. Nos. 4,901,500; 4,908,930; 4,751,249; 4,978,562; 4,995,545; 5,124,186; 5,575,526; 5,755,486; 4,923,902; 4,922,596; 4,861,097; 4,732,806; 4,695,343; and 4,610,836 (each of which is incorporated herein by reference in its entirety).

EXAMPLES

Examples 1–6

Foamable compositions in accordance with the invention were prepared using the following components and varying amounts of two different amine-epoxy adduct curatives:

| | Identity | Supplier | Wt., g | phr |
|---|---|---|---|---|
| Component | | | | |
| Epoxy Resin | PEP6134 | Peninsula Polymer | 561.8 | 100 |
| Dicyandiamide | DICY CGNA | Air Products | 42.8 | 7.6 |
| Azodicarbonamide | CELOGEN AZ120 | Uniroyal | 19.2 | 3.4 |
| Fillers | | | | |
| Fumed Silica | CAB-O-SIL TS-720 | Cabot | 3.3 | 0.6 |
| Glass Microspheres | SCITCHLIZE B38/4000 | 3M | 236.6 | 42.1 |
| Calcium Carbonate | WINNOFIL SPT | Zeneca | 55.6 | 9.9 |
| Wollastonite | NYAD G | Nyco | 17.9 | 3.2 |
| Other Additives | | | | |
| Liquid Nitrile Rubber | NIPOL 1312 | Zeon | 48.3 | 8.6 |
| Urea Accelerator | BIK OT | Uniroyal | 2.5 | 0.4 |
| Carbon Black Colorant | MONARCH 120 | Cabot | 1.4 | 0.2 |
| Silane Adhesion Promoter | A1120 | Union Carbide | 0.4 | 0.1 |

Example 1 used 10.2 g. (1.0 wt.%, 1.8 phr) AJICURE PN-23 amine-epoxy adduct curative (a product of Ajinomoto Company Limited), while Example 2 used the same amount of AJICURE PN-40 amine-epoxy curative (also a product of Ajinomoto Company Limited). In Examples 3–6, the amounts of AJICURE PN-40 were varied as shown in Table 1. Each of the examples exhibited improved storage stability at ambient temperatures, yet foamed and cured when heated to provide a reinforcing foam having good physical properties.

TABLE I

| Example | 1 | 2 | 3 | 4 | 5 | 6 |
|---|---|---|---|---|---|---|
| Amine-Epoxy Adduct | AJICURE PN-23 | AJICURE PN-40 | AJICURE PN-40 | AJICURE PN-40 | AJICURE PN-40 | AJICURE PN-4- |
| Weight (g) | 10.2 | 10.2 | 8.0 | 9.0 | 12.0 | 14.0 |
| (%) | 1.0 | 1.0 | 0.8 | 0.9 | 1.2 | 1.4 |
| (phr) | 1.8 | 1.8 | 1.4 | 1.6 | 2.1 | 2.5 |
| Expansion(%) | 63 | 93 | 113 | 120 | not run | 86 |
| Compressive Strength, psi | 7000 | 6333 | 6167 | 5833 | 8367 | 8033 |
| Lap Shear, psi | 90 | 146 | 64 | — | 97.6 | 122 |

Examples 7–12

Examples 1–6 were repeated using higher amounts of the fumed silica and lower amounts of the blowing agent:

| Component | Wt., g | phr |
|---|---|---|
| Epoxy Resin | 528.7 | 100 |
| Dicyandiamide Curative | 40.4 | 7.6 |
| Azodicarbonamide Blowing Agent | 8.7 | 1.7 |
| Fillers | | |
| Fumed Silica | 20.2 | 3.8 |
| Glass Microspheres | 223.3 | 42.2 |

-continued

| Component | Wt., g | phr |
|---|---|---|
| Calcium Carbonate | 52.5 | 9.9 |
| wollastinite | 16.8 | 3.2 |
| Other Additives | | |
| Liquid Nitrile Rubber | 45.7 | 8.7 |
| Urea Accelerator | 2.4 | 0.5 |
| Carbon Black Colorant | 1.4 | 0.3 |
| Silane Adhesion Promoter | 0.4 | 0.1 |

The effects of varying the type and relative amount of amine-epoxy adduct curative used are shown in Table II.

TABLE II

| Example | 7 | 8 | 9 | 10 | 11 | 12 |
|---|---|---|---|---|---|---|
| Amine-Epoxy Adduct | AJICURE PN-23 | AJICURE PN-40 | AJICURE PN-40 | AJICURE PN-40 | AJICURE PN-40 | AJICURE PN-40 |
| Weight (g) | 12.6 | 12.6 | 10.0 | 8.0 | 14.0 | 16.0 |
| (%) | 1.3 | 1.3 | 1.1 | 0.8 | 1.5 | 1.7 |
| (phr) | 2.4 | 2.4 | 1.9 | 1.5 | 2.6 | 3.0 |
| Expansion(%) | 37 | 37 | 46 | 42 | — | 45 |
| Uncured Specific Gravity | 0.78 | 0.75 | 0.75 | 0.77 | — | 0.81 |
| Tensile Strength, psi | 152 | 149 | 154 | N/A | N/A | 118 |

Examples 13–18

Foamable compositions in accordance with the invention were prepared using the following components and varying amounts and types of other additives:

| | Identity | Supplier | Wt., g | phr |
|---|---|---|---|---|
| Component | | | | |
| Epoxy Resin | PEP 6134 | Peninsula Polymer | 528.7 | 100 |
| Dicyandiamide Curative | DICYANEX 200 | Air Products | 40.4 | 7.6 |
| Azodicarbonamide Blowing Agent | UNICELL D-200 | Dong Jin Chemical | 14.0 | 2.6 |
| Amine-Epoxy Adduct | AJICURE PN-40 | Ajinomoto | 10.0 | 1.9 |
| Fillers | | | | |
| Fumed Silica | CAB-O-SIL TS-720 | Cabot | 20.2 | 3.8 |
| Calcium Carbonate | ULTRA-PFLEX | Pfizer | 52.5 | 9.9 |
| Other Additives | | | | |
| Liquid Nitrile Rubber | NIPOL 1312 | Zeon | 45.7 | 8.7 |
| Urea Accelerator | BIK OT | Uniroyal | 2.4 | 0.5 |
| Carbon Black Colorant | MONARCH 280 | Cabot | 1.4 | 0.3 |

Table III shows the results obtained by the use of different fillers and other additives in combination with the above-listed ingredients.

TABLE III

| Example | 13 | 14 | 15 | 16 | 17 | 18 |
|---|---|---|---|---|---|---|
| Additional Component | phr | phr | phr | phr | phr | phr |
| Scatch L276 microspheres[1] | 42.2 | 42.2 | 42.2 | 42.2 | 47.3 | 51.1 |
| KR-55 titanate[2] | — | 0.6 | 0.6 | 0.6 | 0.6 | 0.3 |
| NZ-37 zirconate[3] | — | 0.4 | 0.4 | 0.4 | 0.4 | 0.4 |
| KR-238M titanate[4] | — | 0.4 | 0.4 | 0.4 | 0.4 | 0.4 |
| Z-6020 silane[5] | 0.1 | — | — | — | — | — |
| NYAD G Wollastonite | 3.2 | 3.2 | — | — | — | — |
| glass fiber | — | — | 3.2 | 6.4 | 6.4 | 6.4 |
| Lap Shear, psi | 275 | 296 | 288 | 277 | 276 | 249 |
| Expansion (%) | 53 | 59 | 64 | 74 | 61 | 42 |
| Uncured Specific Gravity | 0.80 | 0.79 | 0.80 | 0.84 | 0.76 | 0.77 |
| Compressive Strength, psi | 10,000 | 8333 | 7833 | 8500 | 9767 | 9333 |

[1]product of Minnesota Mining & Manufacturing
[2]product of Kenrich Petrochemicals
[3]product of Kenrich Petrochemicals
[4]product of Kenrich Petrochemicals
[5]product of Dow Corning Corporation
[6]product of Nyco

Examples 19–25

A series of foamable compositions containing the components listed in Table IV was prepared and evaluated for use in the preparation of structural foams as described in the previous examples. The amounts of the listed components are given as a weight percent of the total foamable composition.

TABLE IV

| Component | Identity | Supplier | Ex. 19 | Ex. 20 | Ex. 21 | Ex. 22 | Ex. 23 | Ex. 24 | Ex. 25 |
|---|---|---|---|---|---|---|---|---|---|
| Epoxy Resin | PEP 6134 | Peninsula Polymer | 56.2 | 54.9 | 55.3 | 51.2 | 52.3 | 53.6 | 56.1 |
| Dicyandiamide Curative | DICY CGNA | Air Products | 4.3 | — | — | — | — | — | — |
|  | DICY 200 | Air Products | — | 4.2 | 4.2 | 3.9 | 4.0 | 4.1 | 43.1 |
| Azodicarbonamide Blowing Agent | CELOGEN AZ120 | Uniroyal | 1.92 | 1.45 | 1.46 | 1.55 | 1.58 | 1.62 | 1.92 |
| Amine-Epoxy Adduct | AJICURE PN-23 | Ajinomoto | 1.02 | — | — | — | — | — | — |
|  | AJICURE PN-40 | Ajinomoto | — | 1.04 | 1.05 | 1.00 | 1.00 | 1.01 | 1.02 |
| Fillers |  |  |  |  |  |  |  |  |  |
| Fumed silica | CAB-O-SIL TS-720 | Cabot | 0.33 | 2.10 | 2.11 | 1.96 | 2.00 | 2.05 | 0.33 |
| Glass microspheres | B38 | 3M | 23.7 | 23.2 | 23.4 | 21.6 | 22.1 | 22.65 | 23.7 |
| Calcium carbonate | ULTRA-PFLEX | Pfizer | 5.6 | 5.45 | 5.5 | 5.1 | 5.2 | 5.3 | 5.6 |
| Wollastonite | NYAD G | Nyco | 1.8 | 1.8 | 1.8 | — | — | — | 1.8 |
| Glass fiber |  |  | — | — | — | 7.8 | 5.9 | 3.4 | — |
| Other Additives |  |  |  |  |  |  |  |  |  |
| Liquid nitrile rubber | NIPOL 1312 | Zeon | 4.8 | 4.8 | 4.8 | 4.9 | 4.9 | 5.1 | 4.8 |
| Urea accelerator | BIK OT | Uniroyal | 0.25 | 0.25 | 0.25 | 0.23 | 0.24 | 0.25 | 0.25 |
| Carbon black colorant | MONARCH 120 | Cabot | 0.14 | 0.14 | 0.14 | 0.13 | 0.13 | 0.14 | 0.14 |
| Silane adhesion promotor | A1120 | Union Carbide | 0.04 | — | 0.04 | — | — | — | 0.04 |
| Titanate | KR 238M | Kenrich Petrochemicals | — | 0.21 | — | 0.19 | 0.2 | 0.2 | — |
| Titanate | KR-55 | Kenrich Petrochemicals | — | 0.31 | — | 0.29 | 0.3 | 0.3 | — |
| Zirconate | NZ-37 | Kenrich Petrochemicals | — | 0.21 | — | 0.19 | 0.2 | 0.2 | — |
| Expansion % |  |  | 80 | 35 | 44 | 44 | 44 | 44 | 71 |
| Lap Shear, psi |  |  | 157 | 313 | 324 | 318 | 349 | 289 | 142 |
| Modulus, psi |  |  | 71.4 | 90.5 | 82.0 | 97.6 | 92.7 | 89.1 | 71.7 |
| Crush Strength, psi |  |  | 3639 | 4306 | 4986 | 4882 | 4515 | 3930 | 3503 |

Examples 26–31

Foamable compositions containing the following ingredients, together with varying amounts of glass fiber, were prepared and evaluated for use as structural foams in accordance with the procedures described in the previous examples.

| Component | Identity | Supplier | Wt., g | phr |
|---|---|---|---|---|
| Epoxy Resin | PEP 6134 | Peninsula Polymer | 528.7 | 100 |
| Dicyandiamide Curative | DICYANEX 200 | American Cyanamide | 40.4 | 7.6 |
| Amine-Epoxy Adduct | AJICURE PN-40 | Ajinomoto | 10.0 | 1.9 |
| Azodicarbonamide Blowing Agent | UNICELL D-200 | Dong Jin Chemical | 16.0 | 3.0 |
| Fillers |  |  |  |  |
| Fumed Silica | CAB-O-SILT5720 | Cabot | 20.2 | 3.8 |
| Glass Microspheres | SCOTCNLITE | 3M | 223.3 | 42.2 |
| Calcium Carbonate | ULTRA-PFLEX | Pfizer | 52.5 | 9.9 |
| Other Additives |  |  |  |  |
| Liquid Nitrile Rubber | NIPOL 1312 | Zeon | 50 | 9.5 |
| Urea Accelerator | BIK TO | Uniroyal | 2.4 | 0.5 |
| Carbon Black Colorant | MONARCH 280 | Cabot | 1.4 | 0.3 |
| Titanate | KR-55 | Kenrich Petrochemical | 3.0 | 0.6 |
| Zirconate | NZ-37 | Kenrich Petrochemical | 2.0 | 0.4 |
| Titanate | KR-238M | Kenrich Petrochemical | 2.0 | 0.4 |

The effect of varying the glass fiber content of such formulations is shown in Table V.

TABLE V

| Example | 26 | 27 | 28 | 29 | 30 | 31 |
|---|---|---|---|---|---|---|
| Glass Fiber Weight |  |  |  |  |  |  |
| (g) | 34.0 | 40.0 | 50.0 | 60.0 | 70.0 | 80.0 |
| (%) | 3.4 | 4.0 | 5.0 | 5.9 | 6.9 | 7.8 |
| (phr) | 6.4 | 7.6 | 9.5 | 11.3 | 13.2 | 15.1 |
| Lap Shear, psi | 288 | 321 | 298 | 284 | 293 | 279 |
| Specific Gravity | 0.78 | 0.78 | 0.80 | 0.82 | 78 | 80 |
| Expansion (%) | 59 | 53 | 57 | 62 | 63 | 70 |

While lap shear values were optimized at a glass fiber of about 4 wt. %, maximum expansion was attained at a glass fiber content of about 7.8 wt. %.

I claim:

1. A storage-stable foamable composition comprised of:
   (a) one or more epoxy resins selected from the group costing of liquid and semi-solid glycidyl ethers of polyhydric phenols having an average of about two epoxy groups per molecule.
   (b) one or more blowing agents, wherein at least one blowing agent is azodicarbonamide; and
   (c) one or more curatives, wherein a least one curative is an amine-epoxy adduct;
   wherein said composition is a pliable dough.

2. The composition of claim 1 wherein the amine-epoxy adduct is an imidazole-epoxy adduct.

3. The composition of claim 1 wherein said composition is additionally comprised of one or more fillers.

4. The composition of claim 3 wherein at least one of said fillers is a glass filler.

5. The composition of claim 1 wherein hollow glass microspheres comprise from about 5 to about 50 percent by weight of the composition.

6. The composition of claim 1 wherein azodicarbonamide is essentially the only blowing agent in said composition.

7. The composition of claim 1 wherein a nitrogen-containing compound is utilized as one of the curatives in addition to the amine-epoxy adduct.

8. The composition of claim 1 wherein said composition is additionally comprised of a toughening/flexibilizing agent.

9. The composition of claim 1 wherein said composition is additionally comprised of an adhesion promoter.

10. The composition of claim 1 wherein said composition is additionally comprised of a blowing agent accelerator.

11. The composition of claim 1 wherein said composition is comprised of from about 35 to about 85 weight % of the epoxy resins, from about 0.1 to about 5 weight % of the blowing agents, and from about 0.1 to about 5 weight % of the amine-epoxy adduct curatives.

12. The composition of claim 1, wherein said composition is additionally comprised of one or more guanidines as curatives.

13. A foam obtained by heating the storage-stable foamable composition of claim 1 at a temperature of at least about 120° C.

14. A method of producing a foam comprising heating the storage-stable foamable composition of claim 1 at a temperature of at least about 120° C.

15. A storage-stable foamable dough comprised of:
(a) from about 35 to about 85 weight % total of one or more epoxy resins, wherein at least one of said epoxy resins is a glycidyl ether of a polyhydric phenol which has an average of about two epoxy groups per molecule and which is liquid or semi-solid at room temperate;
(b) from about 0.1 to about 5 weight % total of one or more blowing agents, wherein at least one blowing agent is azodicarbonamide; and
(c) from about 0.1 to about 10 weight % total of one or more curatives, wherein at least one curative is an imidazole-epoxy adduct and at least one curative is a guanidine;
(d) from about 5 to 60 weight % total of one or more fillers, wherein hollow glass microspheres are utilized as at last one of said fillers; and
(e) optionally, one or more additional additives selected from the group consisting of adhesion promoters, flexibilizing/toughening agents, colorants, stabilizers, and blowing agent accelerators.

16. The foamable dough of claim 15 wherein azodicarbonamide is essentially the only blowing agent in said foamable dough.

17. A foam obtained by heating the storage-stable foamable dough of claim 15 at a temperature of at least about 150° C. for a time effective to foam and cure said storage-stable foamable dough.

18. A method of producing a foam comprising heating the storage-stable foamable dough of claim 15 at a temperature of at least about 150° C. for a time effective to foam and cure said storage-stable foamable dough.

19. A storable-stable foamable dough comprised of:
(a) one or more epoxy resins, at last one of said epoxy resins being a liquid glycidyl ether of bisphenol A having an epoxide equivalent weight of from about 150 to 1000 and an average of about 2 epoxy groups per molecule;
(b) one or more blowing agents, wherein azodicarbonamide comprises at least about 80% by weight of said blowing agents;
(c) two or more curatives, wherein at least one curative is an imidazole-epoxy adduct and at least one curative is dicyandiamide;
(d) one or more fillers, wherein hollow glass microspheres are utilized as at least one of said fillers and comprise from about 5 to about 50 weight % of the foamable dough;
(e) one or more adhesion promoters;
(f) one or more flexibilizing/toughening agents; and
(g) one or more blowing agent accelerators.

20. The storage-stable foamable dough of claim 19 wherein the adhesion promoters are selected from the group consisting of silanes, titanates, and zirconates.

21. The storage-stable foamable dough of claim 19 wherein at least one of the flexibilizing/toughening agents is a liquid nitrile rubber.

22. The storage-stable foamable dough of claim 19 wherein glass fibers are additionally utilized as one of the fillers.

23. The storage-stable foamable dough of claim 19 wherein at least one of the said blowing agent accelerators is a urea.

24. A foam obtained by heating the storage-stable foamable dough of claim 19 at a temperature of at least about 150° C. for a time effective to foam and cure said storage-stable foamable dough.

25. A method of producing a foam comprising heating the storage-stable foamable dough of claim 19 at a temperature of at least about 150° C. for a time effective to foam and cure said storage-stable foamable dough.

* * * * *

UNITED STATES PATENT AND TRADEMARK OFFICE
CERTIFICATE OF CORRECTION

PATENT NO. : 6,376,564 B1
DATED : April 23, 2002
INVENTOR(S) : Harrison

It is certified that error appears in the above-identified patent and that said Letters Patent is hereby corrected as shown below:

Column 12,
Line 51, delete "costing", insert therefor -- consisting --.
Line 56, after "wherein", delete "a", and insert therefor -- at --.

Column 13,
Line 18, after "claim 1", delete ",".
Line 32, delete "temperate", and insert therefor -- temperature --.
Line 43, delete "last", and insert therefor -- least --.

Column 14,
Line 10, delete "last", and insert therefor -- least --.

Signed and Sealed this

Twenty-fourth Day of June, 2003

JAMES E. ROGAN
*Director of the United States Patent and Trademark Office*